United States Patent

[11] 3,617,769

[72] Inventor Raymond C. Hanson
Loveland, Colo.
[21] Appl. No. 806,568
[22] Filed Mar. 12, 1969
[45] Patented Nov. 2, 1971
[73] Assignee Hewlett-Packard Company
Palo Alto, Calif.

[54] WAVE GENERATOR HAVING FREQUENCY-DEPENDENT TRIGGER LEVEL FOR CORRECTION OF LOOP DELAY
2 Claims, 1 Drawing Fig.

[52] U.S. Cl. ........ 307/229, 307/261, 307/264, 307/271, 307/286, 328/127, 328/181, 328/184
[51] Int. Cl. ........ H03k 5/00, H03k 4/06
[50] Field of Search ........ 307/228, 229, 261, 264, 271, 286; 328/127, 181–184

[56] References Cited
UNITED STATES PATENTS

| | | | |
|---|---|---|---|
| 3,274,501 | 9/1966 | Heinsen | 307/229 X |
| 3,302,132 | 1/1967 | Karklys | 307/229 X |
| 3,350,574 | 10/1967 | James | 307/261 |
| 3,405,286 | 10/1968 | Mudie | 307/229 X |
| 3,440,448 | 4/1969 | Dudley | 307/271 |

*Primary Examiner*—Stanley D. Miller, Jr.
*Attorney*—A. C. Smith

ABSTRACT: A wave generator includes an integrator with adjustable upper and lower limit detectors coupled to the output of the integrator for periodically reversing the current applied to the integrator to produce a repetitive triangle wave. The upper and lower levels of the triangle wave at which the detectors are actuated are altered as the operating frequency of the circuit increases.

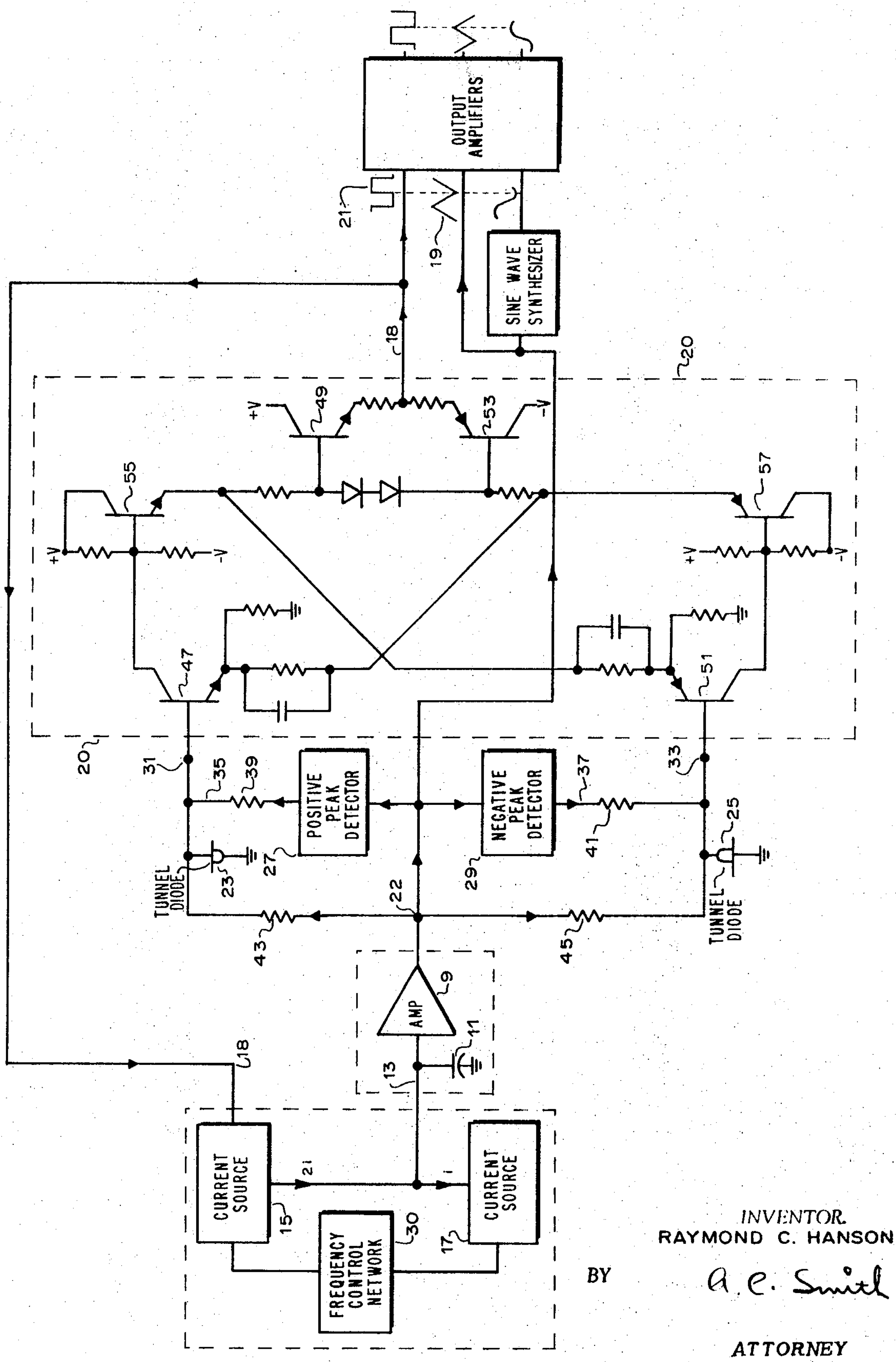
INVENTOR.
RAYMOND C. HANSON
BY a. e. Smith
ATTORNEY

WAVE GENERATOR HAVING FREQUENCY-DEPENDENT TRIGGER LEVEL FOR CORRECTION OF LOOP DELAY

BACKGROUND OF THE INVENTION

Certain known wave generators detect upper and lower levels of signal at the output of an integrator for triggering a reversal of current supplied to the integrator, thereby to produce a repetitive triangle having upper and lower peak amplitudes substantially equal to the respective upper and lower detection levels. Wave generators of this type are described in the literature (see, for example, U.S. Pat. No 2,748,272, entitled FREQUENCY GENERATOR, issued on May 29, 1956 to N. B. Schrock). One disadvantage encountered with wave generators of this type is that at extremely high operating frequencies, the delay between the instant when the output level of the integrator is detected and the instant when the current applied to the integrator reverses becomes an appreciable portion of the total period of the generated waveform. As a result, the output of the integrator overshoots the detection level as the operating frequency increases, thereby greatly decreasing the stability of the generated wave as a function of frequency.

SUMMARY OF THE INVENTION

Accordingly, the present invention includes level detectors which provide adjustable upper and lower detection limits for eliminating the effects of the delay in switching signal directions at high frequencies. These detectors selectively adjust the levels at which signal directions reverse in order to compensate for the switching delays encountered at high operating frequencies.

DESCRIPTION OF THE DRAWING

The drawing is a schematic diagram of the preferred embodiment of the present invention including circuitry for overcoming the effects of switching delay at high operating frequencies.

DESCRIPTION OF THE PREFERRED EMBODIMENT

Referring now to the drawing, there is shown an amplifier 9 with a capacitor 11 connected to the input of the amplifier 9 for operation as an integrator. Current is supplied to the input 13 of the integrator 9, 11 in alternate directions by the current sources 15 and 17. Current source 15 may supply current, say at twice the value of the current supplied by source 17 and in the opposite direction, under the control of switching signal 21 supplied thereto on line 18 by the multivibrator 20. As a result, current flows into the input 13 of the integrator 9, 11 when current source 15 is active, and out of the input 13 when current source 15 is inactive to produce a triangle waveform 19 at the output 22 of the integrator 9, 11. The frequency at which the triangle waveform is produced may be selected by altering the magnitude of the currents from sources 15, 17 (in a fixed ratio to maintain the same shape waveform) and this may be accomplished by the frequency control network 30 connected to each of the sources 15 and 17. Frequency control circuits for function generators of this type are described, for example, in U.S. Pat. Application Ser. No. 505,796, entitled GENERATOR FOR PRODUCING SYMMETRICAL TRIANGULAR WAVES OF VARIABLE REPETITION RATE, filed on Nov. 1, 1965, by Robert L. Dudley now issued as U.S. Pat No. 3,440,448.

The switching signal 21 on line 18 that reverses the direction of the current applied to the input of the integrator 9, 11 is produced by the multivibrator 20 in response to the triangle waveform 19 at the output 22 attaining upper and lower amplitude limit values. These upper and lower limit values are set respectively by the trigger levels of tunnel diodes 23 and 25 in combination with bias currents supplied thereto by the respective ones of the peak detectors 27 and 29. The transition in the conduction condition of tunnel diode 23 in response to the triangle waveform 19 attaining an upper or positive amplitude value produces a positive switching signal at the input 31 of the multivibrator 20. This causes the multivibrator 20 to apply to the current source 15 the switching signal 21 that inactivates the current source 15 and causes the current at the input of the integrator 9, 11 to reverse direction. Similarly, when the triangle waveform 19 attains a lower or negative amplitude value, the resulting transition in the conduction condition of tunnel diode 25 produces a negative switching signal at the input 33 of the multivibrator 20. This causes the multivibrator 20 to apply to the current source 15 the switching signal 21 that activates the current 15 to again reverse the direction of current in the input of integrator 9, 11. Operation of the circuit continues repetitively in this manner to produce the triangle wave 19 at the output of the integrator 9, 11.

In accordance with the illustrated embodiment of the present invention, the upper (or positive) and lower (or negative) valves of the amplitude of the triangle waveform 19 at which the multivibrator 20 triggers are altered at high operating frequencies to compensate for the effects of the delay in switching the direction of the current in the input of the integrator 9, 11. Thus, by causing the multivibrator 20 to trigger at some lower limit for the positive portion (and at a higher limit for the negative portion) of the triangle waveform, the direction of current in the input of the integrator 9, 11 is switched at the correct instant when the circuit delays are over. This assures generation of a constant-amplitude triangle wave over the range of operating frequencies and also assures accurate frequency calibration and a high degree of frequency stability.

The circuit delays to be compensated for are manifested as changes in the peak amplitudes of the triangle waveform and these delays, typically of the order of 20 nanoseconds, become more significant producing greater overshoot of the triangle waveform as the operating frequency increases. The positive and negative peak detectors 27 and 29 respond to the peak amplitudes attained by the triangle waveform 19 and produce bias currents respectively on lines 35 and 37 that are related to the associated positive and negative peaks of the triangle waveform 19. These bias currents are applied through resistors 39 and 41 to the respective tunnel diodes 23 and 25 such that, in combination with the triangle waveform applied thereto through resistors 43, 45, the tunnel diodes are caused to switch conduction conditions prior to the appearances of the normal peaks. By properly selecting the peak voltage input-to-bias current output of the peak detectors 27 and 29, this pretriggering of the tunnel diodes 23, 25 may substantially compensate for the switching delays in reversing the integrator current. In practice, this aspect of the invention maintains the peak amplitudes of the triangle waveform approximately constant within about 3 percent to 5 percent variation over the entire operating range of frequencies up to about 10 megaHertz.

The signal which appears at input 31 of multivibrator 20 is a positive impulse produced by the transition between conduction conditions of tunnel diode 23 during the positive-going portion of the triangle wave 19. Similarly, the signal which appears at input 33 of multivibrator 20 is a negative impulse produced by the transition between conduction conditions of tunnel diode 25 during the negative-going portion of the triangle wave 19. Thus, the multivibrator 20 produces the switching signal 21 on line 18 in response to positive and negative impulses alternately and cyclically applied to the inputs 31 and 33 of the multivibrator 20.

When transistor 47 is not conducting, the base circuitry associated with transistor 55 establishes a particular voltage at the emitter of transistor 55. Through emitter cross-coupling from transistor 55 to transistor 51, this emitter voltage establishes a selected current in the collector of transistor 51. The collector of transistor 51 is, in turn, connected to the base circuitry of transistor 57 such that a particular voltage is established at the emitter of transistor 57. The cross-coupling from the emitter of transistor 57 to the emitter of transistor 47 thus biases transistor 47 to respond to a positive signal from input 31. Similarly, when transistor 51 is not conducting, the base circuitry associated with transistor 57 establishes a particular voltage at the emitter of transistor 57. Through emitter cross-coupling from transistor 57 to transistor 47, this emitter voltage establishes a selected current in the collector of transistor 47. The collector of transistor 47 is connected to the base circuitry of transistor 55 such that a particular voltage is established at the emitter of transistor 55. The cross-coupling from the emitter of transistor 55 to the emitter of transistor 51 thus biases transistor 51 to respond to a negative signal from input 33. Transistors 49 and 53 are connected to provide an emitter-coupled output from transistors 55 and 57 to line 18.

The inputs 31 and 33 of the transistors 47, 51 are coupled to receive the positive and negative triggering signals, respectively, from the associated tunnel diodes 23, 25 and peak detectors 27, 29. The multivibrator 20 thus responds alternately to positive and negative trigger signals applied to inputs 31 and 33 to produce the square wave control signal 21 which is applied via line 18 to the current source 15 for producing the repetitive triangle wave 19 at the output 22 of the integrator 9, 11.

I claim:

1. Signalling apparatus comprising:
integrator means having an input and an output;
source means connected to the input of said integrator means for applying signal thereto of selected amplitude and polarity in response to control signal applied thereto;
circuit means including a pair of trigger circuits connected to apply control signal to said source means for reversing the polarity of signal applied to said integrator means in response to the amplitude of the signal appearing at the output of said integrator means attaining selected upper and lower trigger levels which are altered in response to a level-adjusting signal applied thereto; and
level-control means connected to apply to said circuit means for altering the trigger level thereof a level-adjusting signal which is representative of the delay in said source means reversing the polarity of signal applied to said integrator means, the level-control means including for each of said trigger circuits a peak detector responsive to a selected one of the upper and lower peak amplitudes of the signal appearing at the output of said integrator means for decreasing the respective one of said upper and lower trigger levels in response to increase in the corresponding one of the upper and lower peak amplitudes of the signal appearing at the output of said integrator means.

2. Signalling apparatus comprising:
integrator means having an input and an output;
source means connected to the input of said integrator means for applying signal thereto of selected amplitude and polarity in response to control signal applied thereto;
circuit means connected to apply control signal to said source means for reversing the polarity of signal applied to said integrator means in response to the amplitude of the signal appearing at the output of said integrator means attaining a selected trigger level which is altered in response to a level-adjusting signal applied thereto;
level-control means connected to apply to said circuit means for altering the trigger level thereof a level-adjusting signal which is representative of the delay in said source means reversing the polarity of signal applied to said integrator means, said level-control means including an amplitude detecting circuit responsive to the signal appearing at the output of said integrator means for decreasing said selected trigger level at which the circuit means applies control signal to said source means in response to an increase in the peak amplitude of the signal appearing at the output of said integrator means;
said circuit means including a first tunnel diode which is connected to produce a positive trigger signal in response to the signal appearing at the output of said integrator means attaining an upper selected trigger level and a second tunnel diode which is connected to produce a negative trigger signal in response to the signal appearing at the output of said integrator means attaining a lower selected trigger level;
said amplitude-detecting circuit being connected to supply to said first and second tunnel diodes bias currents which decrease the respective trigger levels with increasing peak amplitude of the signal appearing at the output of said integrator means; and
said circuit means also including a multivibrator circuit connected to respond to the alternate application thereto of the positive and negative trigger signals for applying a square wave control signal to said source means to reverse the polarity of signal applied to the input of said integrator means thereby at each transition of said square wave control signal.

* * * * *